United States Patent
Noel et al.

(10) Patent No.: US 7,266,382 B2
(45) Date of Patent: Sep. 4, 2007

(54) METHOD AND APPARATUS FOR DECREASING PERCEIVED PUSH-TO-TALK CALL SET-UP TIME USING A BUFFER FOR INITIAL SPEECH BURST

(75) Inventors: Paul A. Noel, Naperville, IL (US); Bruce M. Riley, Naperville, IL (US); Laurel Salvador, Wheaton, IL (US); Donna Michaels Sand, Redmond, WA (US); David Walter Vollman, Naperville, IL (US); Joe Ping Zhou, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 426 days.

(21) Appl. No.: 10/635,300

(22) Filed: Aug. 6, 2003

(65) Prior Publication Data

US 2005/0032538 A1    Feb. 10, 2005

(51) Int. Cl.
*H04B 7/00* (2006.01)
(52) U.S. Cl. .................................. 455/518; 455/552.1
(58) Field of Classification Search ............ 455/426.1, 455/518, 416, 90.2, 466, 519, 522.1, 553.1
See application file for complete search history.

(56) References Cited

U.S. PATENT DOCUMENTS 5,555,447 A    9/1996    Grube et al.

2002/0102999 A1*    8/2002    Maggenti et al. ........... 455/518
2002/0173325 A1    11/2002    Maggenti et al.

FOREIGN PATENT DOCUMENTS

| EP | 1 182 895 A | 2/2002 |
|---|---|---|
| WO | WO9006636 A | 6/1990 |

* cited by examiner

*Primary Examiner*—Edward F. Urban
*Assistant Examiner*—Tu X. Nguyen

(57) ABSTRACT

In a telecommunications system (100), a method and apparatus for buffering the initial speech of an initial speaker in a push-to-talk call is disclosed. The method includes the steps of determining at least one participant or group to call (410, 510), sending a call request to the at least one participant or group (520), determining if the at least one participant or group is registered with the telecommunications system, notifying the initial speaker to begin speaking after determining at least one participant is registered with the telecommunications system but prior to connecting all called parties, receiving and digitizing voice packets from the initial speaker, storing the digitized data packets in a storage medium and transmitting the digitized voice packets when a predetermined packet transmission triggering event occurs. The apparatus for buffering the initial speech burst of an initial speaker in a call includes a first server (140) and a second server (150) communicatively connected to the first server. The second server is programmed to execute the steps of the method described above.

14 Claims, 6 Drawing Sheets

METHOD AND APPARATUS FOR DECREASING PERCEIVED PUSH-TO-TALK CALL SET-UP TIME USING A BUFFER FOR INITIAL SPEECH BURST

FIELD OF THE INVENTION

The present invention relates generally to wireless communications using a push-to-talk feature, and more particularly, to a method and apparatus for buffering the initial talk burst of a call on a wireless standard-based packet data network to decrease the perceived call setup time.

BACKGROUND OF THE INVENTION

In the world of wireless communication, there are many methods in which to communicate over a wireless network. Among these methods of wireless communication is push to talk. Push to talk (PTT) allows a user to communicate over an air channel merely by pressing and holding the appropriate PTT button on a wireless phone. This allows a user near instant access to any user in a predetermined call group, since no dialing is required and the listener(s) or called party(ies) does not have to answer. More importantly, the called party(ies) or listener(s) can not elect to not answer the call. This is vastly different from traditional cellular calls that: (1) require the user to dial a phone number or numbers; and (2) require the user to wait before speaking until the call is answered and connected.

Despite all of the benefits, push to talk is not without its limitations. For example, current proprietary push-to-talk systems use a dedicated air channel for communications. This means the air link channel is reserved for use even though no users may be using it. Also, push-to-talk phones on proprietary push-to-talk systems typically never shift to a dormant mode, because the air channel is reserved. This is advantageous because it allows a user to receive a push to talk communication without waiting for the phone to go from a dormant mode to an active mode. However, this is a waste of resources as the channel could be used for other calls and power resources on the wireless phone may be wasted. In standards-based wireless networks that incorporate a PTT feature, communication channels are not reserved for the PTT feature. This eliminates the waste in communication resources, but increases the time from a PTT request to an indication that the caller can begin speaking. If the called party is allowed to go dormant and is dormant, as is the case in standards-based packet data networks, such as, for example, Telecommunications Industry Association/Electronic Industries Alliance IS-835, then the time from a PTT request to an indication that the caller can begin speaking is even longer, due to the time required to activate the wireless phone from a dormant state. Unfortunately, for users that are accustomed to the proprietary PTT systems, the delay in such a PTT connection is undesirable and in some case unacceptable.

PTT calls use a half-duplex communications system and therefore, only one person can have the ability to speak at a time. All calls are handled on a first come, first serve basis. That is the first PTT requestor "receives the floor," so to speak and holds the floor until it is released. Because of this arrangement, existing PTT systems do not allow for efficient queuing of call participants. This can lead to a disorganized and inefficient call, as a user with little to say can dominate a call by simply pressing and holding the appropriate button on a wireless phone.

Therefore, a need exists for a method and apparatus for preserving wireless resources while saving call setup time and for queuing multiple participants in a call.

SUMMARY OF THE INVENTION

An object of the present invention is to decrease the perceived amount of time necessary to set up a PTT call. Another object of the present invention is to decrease the amount of resources necessary to conduct a call. Other objects of the present invention will become more apparent to persons having ordinary skill in the art to which the present invention pertains from the following description in conjunction with the accompanying figures.

In accordance with one aspect of the present invention, an apparatus for buffering the initial talk burst of a call on a wireless standard based packet data network is disclosed. The apparatus includes a push-to-talk server and a media duplicator communicatively coupled to one another and programmed to execute the functions described below.

In accordance with another aspect of the present invention, a method for buffering the initial talk burst of a call on a wireless standard based packet data network is disclosed. The method includes determining whether at least one participant of a call is registered with the network, and if so, directing the push to talk server to assign a media duplicator to the call. Once the media duplicator is allocated to the call, the push-to-talk server sends a message to the call originator indicating the call may proceed. As the call originator begins to speak, the voice packets from the speaker are digitized and sent to the media duplicator. The digitized voice packets are stored in a buffer, in a first in, first out order. When the called parties are connected to the call, the buffer of packets is played out for the called parties to hear.

Preferably, if the capacity of the buffer is exceeded, the oldest voice packets are discarded, and the most recent packets are kept. When the digitized voice packets are transmitted to the call participants, the called parties will hear the most recent segment of the buffered speech. The buffered voice packets are transmitted or played to the called parties when: (1) a predetermined percentage of the called parties answer; (2) when a predetermined timer expires; or (3) when all of the called parties answer or are connected. The buffered packets are transmitted at a predefined rate to avoid flooding the mobile devices with data. During transmission, any new packets received from the originating mobile client are placed at the end of the buffer. After the buffered packets have all been transmitted, it is not necessary to buffer future packets and they are immediately duplicated and sent to the called parties in the normal manner.

DETAILED DESCRIPTION OF THE PREFERRED EMBODIMENTS

In accordance with the preferred embodiments of the present invention, and with reference to FIGS. 1-5, a method and apparatus for queuing participants in a call and for buffering the initial speech of the originator of a call are disclosed.

Figure 1:
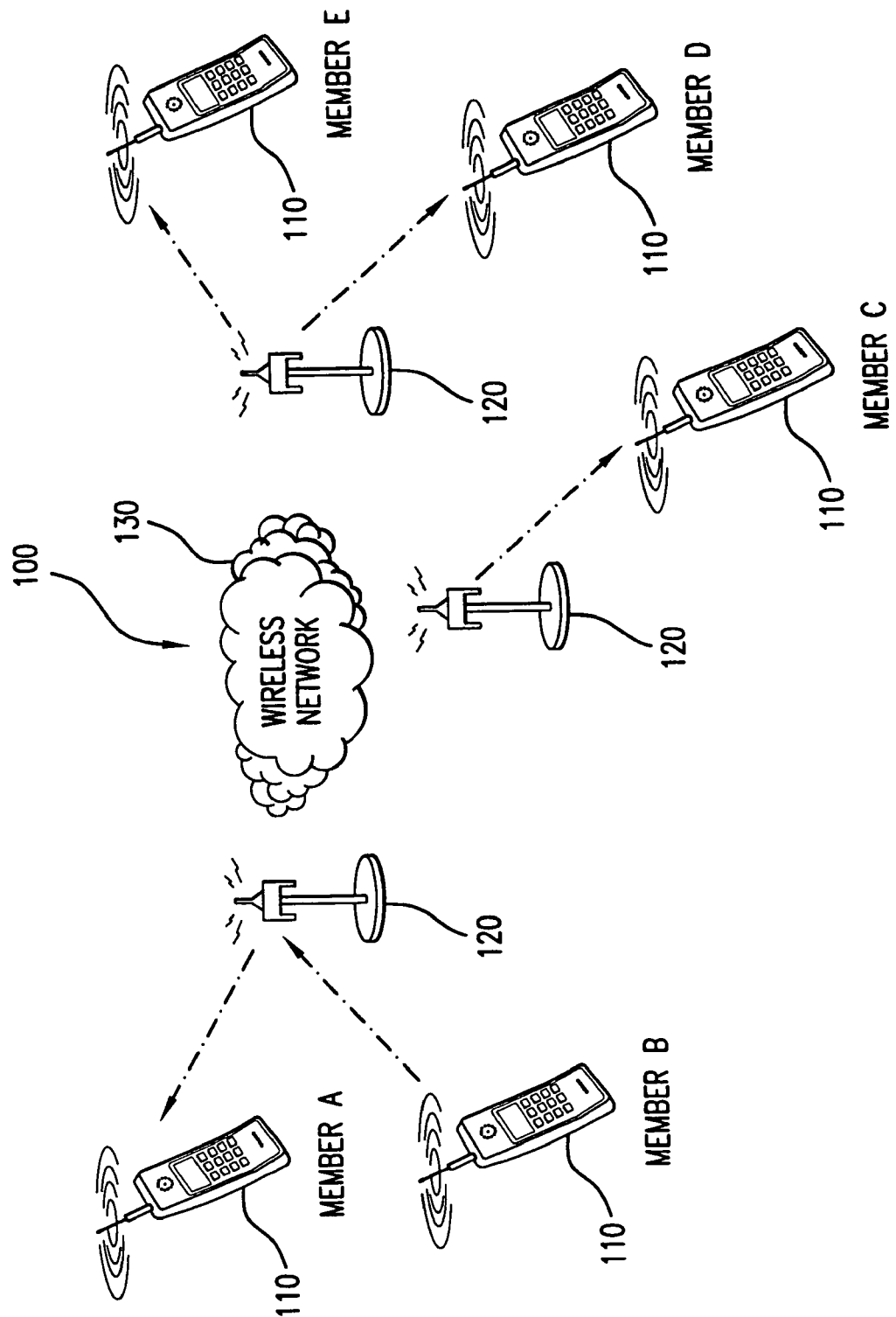
FIG. 1 is a pictorial diagram showing a data network infrastructure in accordance with the present invention.

FIG. 1 is a pictorial diagram showing a wireless communication network infrastructure in accordance with the present invention. The wireless communication network infrastructure 100 includes mobile devices 110, a wireless or cellular tower 120 and a wireless network 130. In operation, the mobile device 110 transmits data packets to the cellular tower 120 which in turn transmits the data packets to the wireless network 130. The wireless network 130 processes the data packets and transmits the data packets to another cellular tower 120, which in turn transmits the data packets to another mobile device 110. While the mobile device 110 is shown in FIG. 1 as a wireless phone, it should be recognized that any device capable of receiving wireless transmissions is readily substituted for the wireless phone, for example, a personal digital assistant or a computer capable of sending and/or receiving wireless data.

Figure 2:
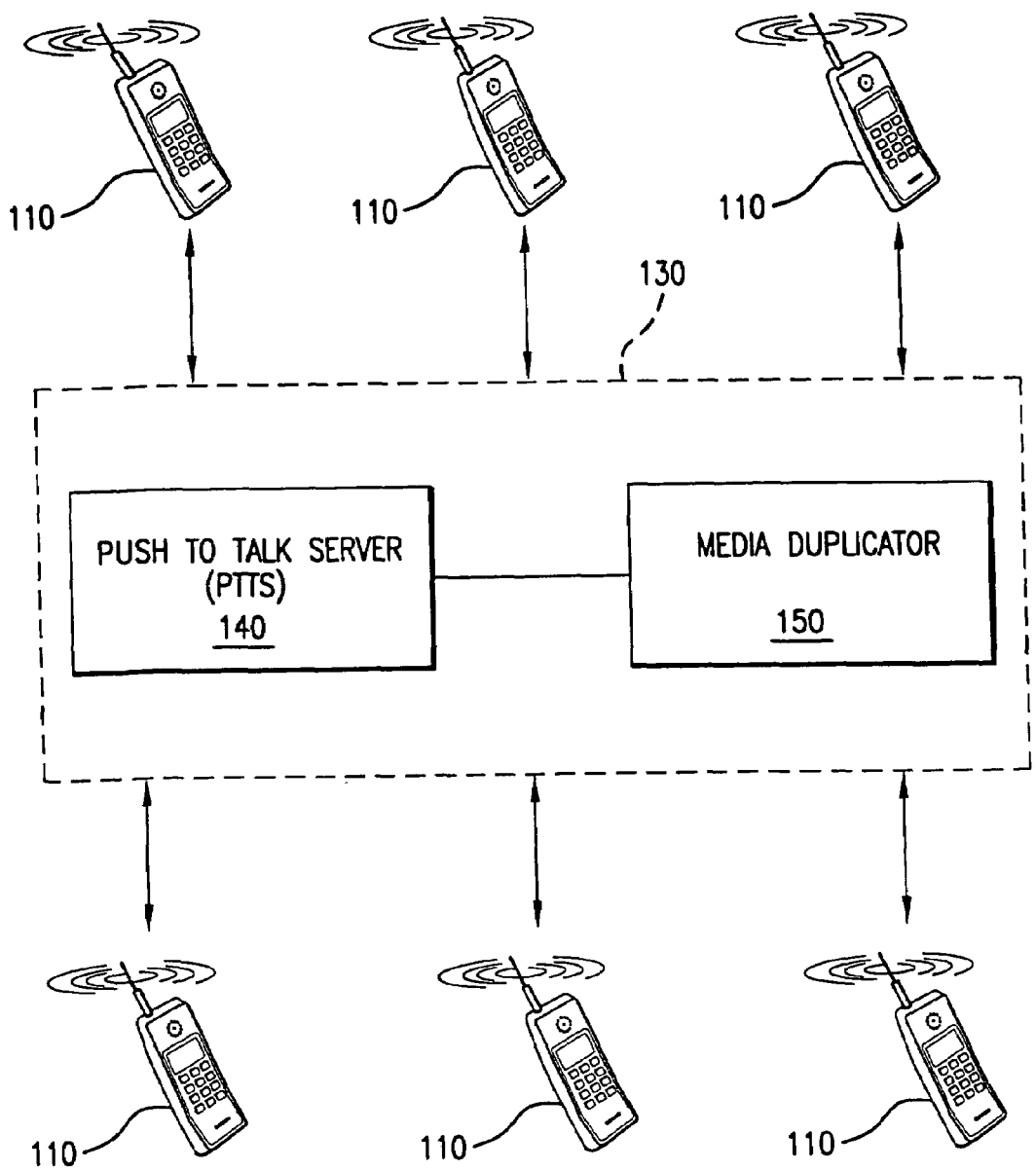
FIG. 2 is a block diagram showing a portion of a wireless network in accordance with the present invention.

FIG. 2 is a block diagram illustrating two components of a wireless network 130. The two components of the wireless network 130 are a push-to-talk (PTT) server 140 and a media duplicator 150. The PTT server 140 and the media duplicator 150 are communicatively connected to one another and both are capable of transmitting data to and receiving data from the mobile device 110 via cellular tower 120. Both the PTT server 140 and the media duplicator 150 are known computer processors which in turn are programmed to perform all of the operations necessary for wireless communication including, processing data packets and communicating with mobile devices 110, as described herein.

Figure 3:
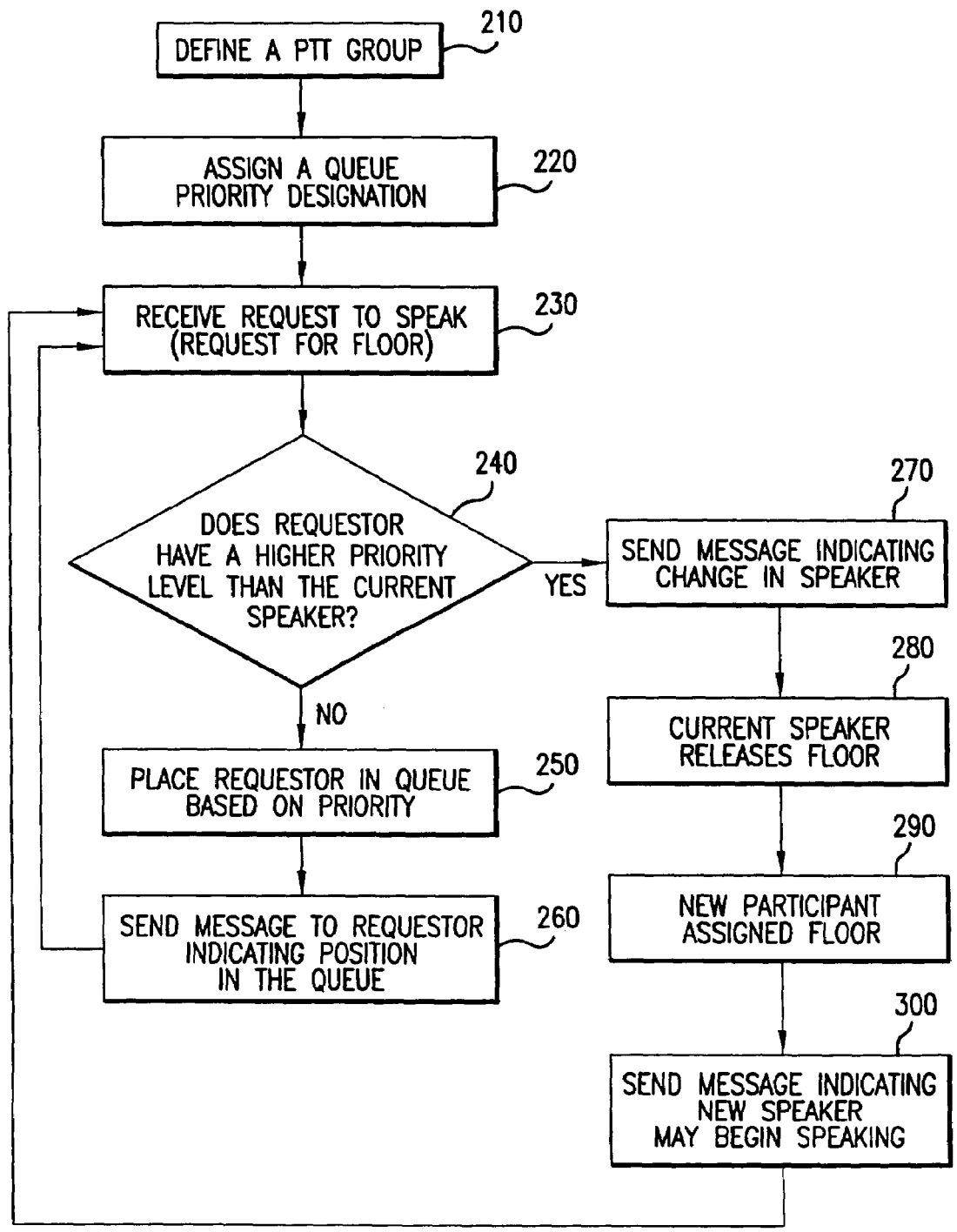
FIG. 3 is a flow chart diagram illustrating one embodiment of a method for queuing participants in a call in accordance with the present invention.

FIG. 3 is a flow chart diagram illustrating one embodiment of a method for queuing participants in a call in accordance with the present invention. The process of queuing participants in a call begins when an initial group of participants for the call is defined (210). The participants in a call are generally selected by a call originator selecting the participants via an Internet interface. Participants can also be selected by a call originator using a call setup protocol or procedure on the mobile device 110. After the participants for the call, sometimes referred to as a call group, are selected, their identities are then transmitted to the PTT server 140 for storage until needed. Concurrent with the selection of the participants in the call, the call originator assigns each participant a priority level (220). Steps 210 and 220 can be done in advance and do not have to be done every time a new call is placed. A priority level is a designation which indicates a participant's relative importance to a call. Priority levels can be assigned to correspond with company hierarchy or with a participant's level of participation on a particular project. As is the case with the initial selection of participants, the call originator has the option of using an Internet interface or a call setup protocol on mobile device 110 to assign each participant in the call a priority level. Each participant's priority level is then transmitted to the PTT server 140 for storage until needed. After the participants have been selected and assigned a priority level, the call is set to begin. The call begins when the call originator begins communicating with the other participants via the mobile device 110. For example, the call begins when the call originator presses the appropriate button, e.g., a PTT button, on a wireless phone.

As the call progresses, a participant may want to speak while another participant is currently speaking. The participant wanting to speak sends a request to speak by making the proper selection. This is typically accomplished by using the PTT button on mobile device 110. This request is received by the PTT server 140 (230). After the request is received, the PTT server 140 compares the assigned priority level of the call participant initiating the request with the assigned priority level of the current speaker (240). If the call participant initiating the request has a lower priority level than that of the current speaker, the call participant initiating the request is placed in a queue in the PTT server 140 and assigned a queue order based on their predetermined level of priority (250). For example, a requestor with a higher priority is placed higher in the queue for faster access than those requesters of a lower priority. A message is then sent to the mobile device 110 of the requestor by the PTT server 140. The message preferably displays the queue position of the call participant initiating the request (260). If the call participant initiating the request has a higher priority level than that of the current speaker, a message is sent by the PTT server 140 to each mobile device 110 or select mobile devices indicating a change in speaker is set to occur (270). Concurrent with the change of speaker message being sent, the current speaker loses the ability to transmit her speech and is placed in the queue in an order appropriate for her assigned priority level (280). After the current speaker's ability to speak is terminated, the call participant initiating the request to speak, and next in the queue, is granted the ability to speak by the PTT server 140 (290). Concurrent with the new speaker being granted the ability to speak, that is, transmit speech, the PTT server sends a message to the mobile device 110 of the new speaker. This message indicates that the new speaker may proceed speaking (300). The new speaker is allowed to speak until a participant with a higher priority requests to speak or until the new speaker has finished speaking and releases the floor. The above described process repeats itself until the call ends.

In a preferred embodiment of the invention, a participant may request to see a list of the queue order and a list of all of the participants in the call. This list is preferably sent from the PTT server and may be displayed on a mobile device or an Internet interface. Additionally, a participant with a high priority level can manipulate the ordering of the queue, delete participants from the queue, change the current speaker, and disable the talk feature for certain participants using a graphical user interface on the mobile device or by using an Internet interface to interact with PTT server 140.

Figure 4:
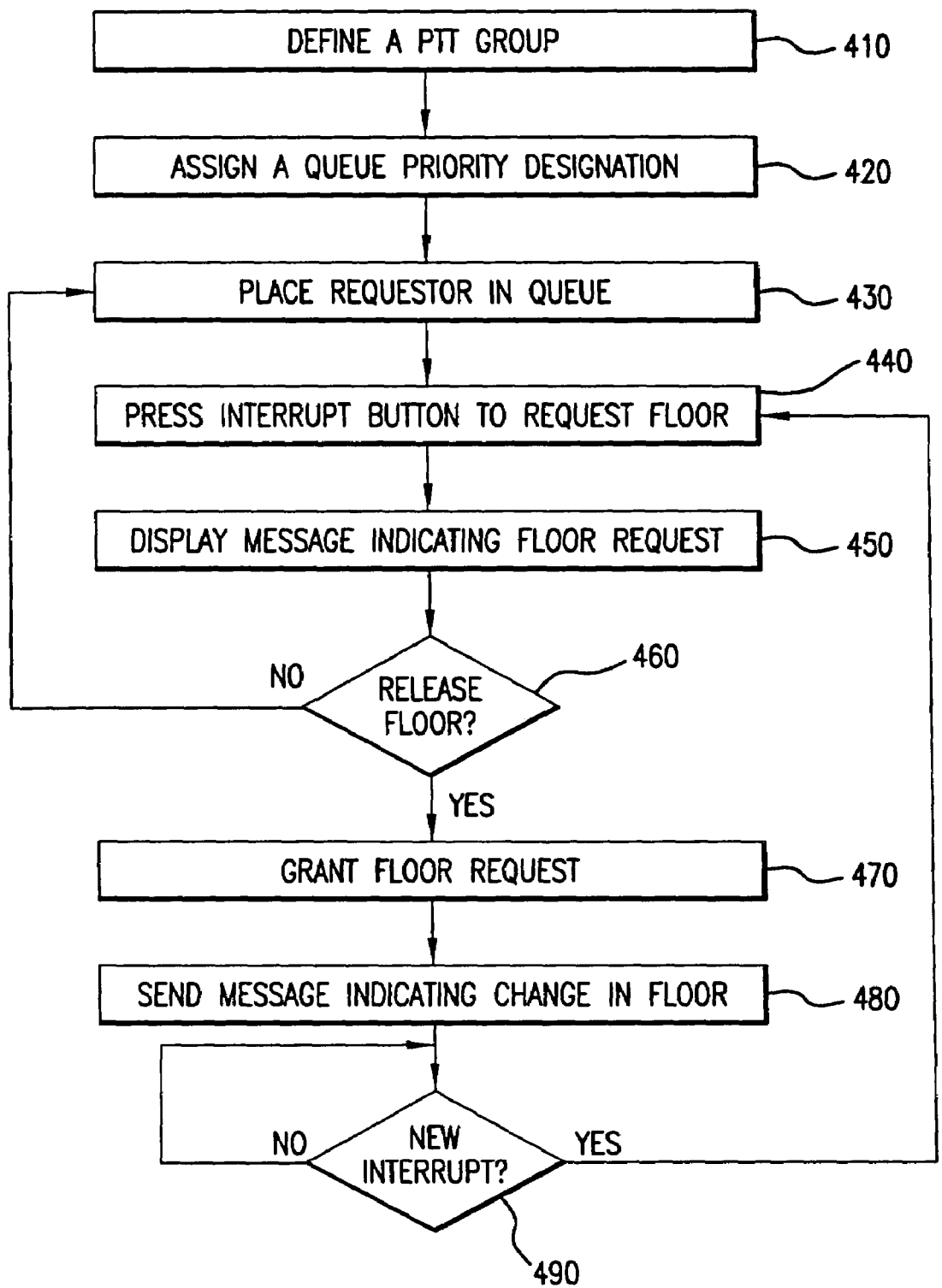
FIG. 4 is a flow chart diagram illustrating another embodiment of a method for queuing participants in a call in accordance with the present invention.

FIG. 4 is a flow chart diagram illustrating another embodiment of a method for queuing participants in a call in accordance with the present invention. The process of queuing participants in a call begins when an initial group of participants for the call is defined (410). As described above, the participants in a call are selected by a call originator selecting the participants using an Internet interface or using a call setup protocol on the mobile device 110. After the participants for the call are selected, their identities are then transmitted to the PTT server 140 for storage until needed. Preferably, concurrent with the selection of the participants in the call, the call originator assigns each participant a priority level (420). A priority level is a designation which indicates a participant's relative importance to a call. Priority levels can be assigned to correspond to a company hierarchy i.e., a president has a priority level of one, a vice president has a priority level of two, etc. or to a participant's level of participation on a particular project. As is the case with the initial selection of participants, the call originator has the option of using an Internet interface or a call setup protocol on mobile device 110 to assign each participant in the call a priority level. Each participant's priority level is then transmitted to the PTT server 140 for storage until needed. After the participants are selected and assigned a priority level, the call is set to begin. The call begins when the call originator begins communicating with the other participants via the mobile device 110. For example, the call begins when the call originator presses the appropriate button or receives the appropriate response on an wireless phone and begins speaking.

At the outset of the call, all of the participants in the call, except the initial speaker, are alternatively placed in the queue by the PTT server 140 (430) or they may be placed in the queue by requesting the floor via a PTT request. Preferably, as the call progresses, a call participant presses an interrupt button on mobile device 110 in an effort to acquire the ability to speak more immediately than in the method described above, and associated with FIG. 3. A call participant typically uses an interrupt button to request the ability to speak (440) where the call participant has an urgent matter to discuss. Once the interrupt button is pressed (440), the PTT server 140 sends a message to the current speaker that one of the call participants wants to interrupt the call on an urgent basis (450). After the message is received by the mobile device 110 of the current speaker, the current speaker has the option of allowing the call participant initiating the request to speak or placing the call participant into the queue (460). The current speaker exercises this option by manipulating a predetermined interface on mobile device 110. If the current speaker elects to allow the call participant initiating the interrupt request to speak, the call participant is granted the ability to speak by the PTT server 140 (470) and a message is sent by the PTT server 140 to all or a select set of the mobile devices 110 participating in the call indicating a change in speaker is set to occur (480). If the call participant is not granted the ability to speak, that is transmit her speech to the others, then the caller is placed in the queue to await her turn based on the assigned priority level. The above described process repeats every time an interrupt request is initiated until the call is ended (490).

Figure 5A:
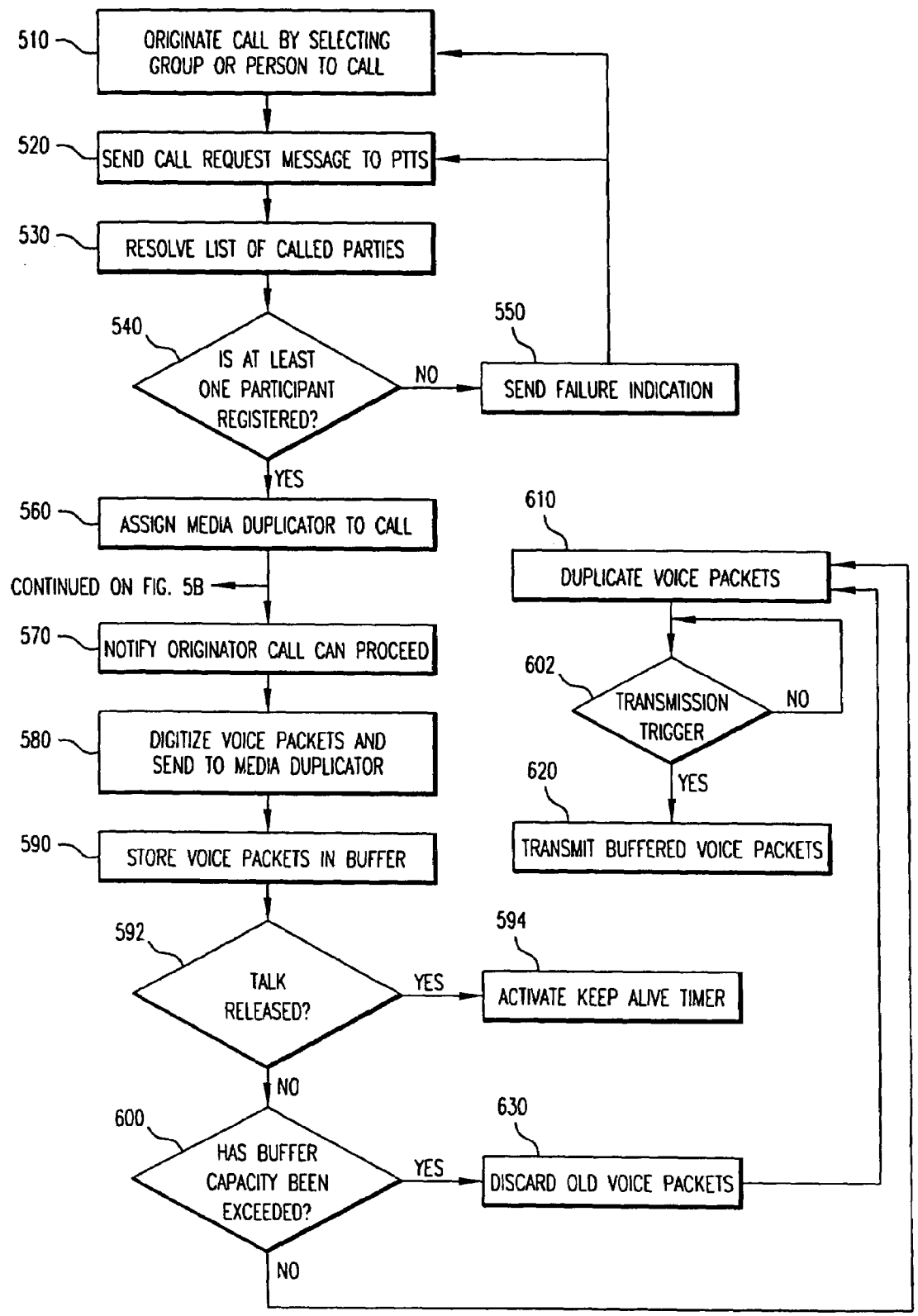
FIGS. 5A and 5B are flow chart diagrams illustrating one embodiment for buffering the initial speech of a call originator in accordance with the present invention.
Figure 5B:
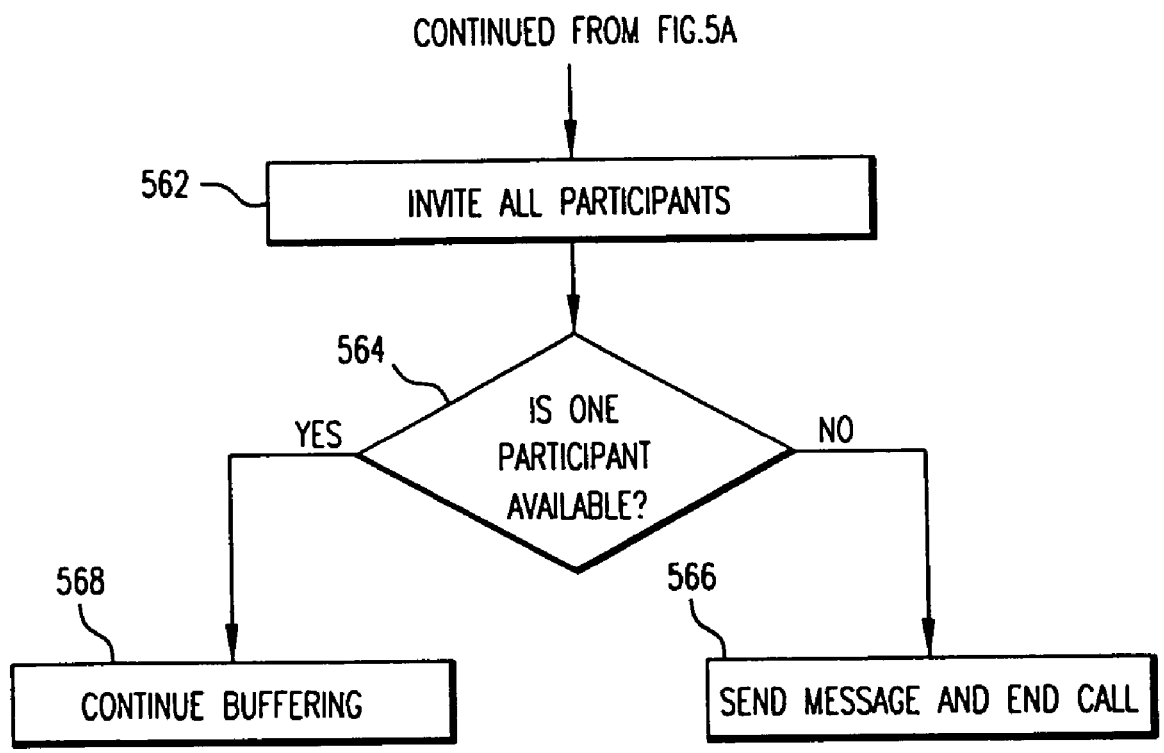

FIGS. 5A and 5B are flow chart diagrams illustrating one embodiment for buffering the initial speech of a call originator in accordance with an aspect of the present invention. The process of buffering the initial speech of a call originator begins when a call is originated by selecting a group or person to call (510). Similar to the methods described above, the selection of a group or person to call is accomplished by the call originator selecting the participants using an Internet interface or using a call setup protocol on the mobile device 110. After the group or person necessary for the call is determined, a call request message, i.e., PTT request, is sent by the call originator via mobile device 110 to the PTT server 140 (520). In response to the received call request message, the PTT server 140 resolves the list of call participants by determining whether the mobile devices of any call participants are currently registered on the network (530). A mobile device is registered when it sends a message on power or when the appropriate feature is selected. If no call participants have mobile devices 110 registered on the network, a failure indication is sent to the PTT requestor (550) and the requestor may initiate another group (510) or another call request (520).

If, on the other hand, at least one participant is registered (540), the PTT server 140 assigns a media duplicator 150 to the call (560) and sends a message to the mobile device 110 of the call originator indicating that the call may proceed (570). Simultaneously, all call participants are invited to join the call (562). If no participant is available to participate in the call (564), then the PTT requestor receives a message from the PTT server indicating the call has ended and the call is terminated, including discarding any buffered speech (566). If on the other hand, at least one participant is available to participate in the call, the call continues, including buffering the speech burst in accordance with the invention, as discussed further below (568).

After the PTT requestor is notified that the call can proceed (570), the PTT requestor begins to speak. As the PTT requestor begins to speak, the voice packets received from the call originator are digitized and transmitted to the media duplicator 150 (580) and stored in a buffer in the media duplicator (590). The digitizing and transmitting of voice packets is accomplished by using methods known in art. The buffer is preferably sized to hold about 1 to 10 seconds (maximum reactivation time) of speech.

If the talk button is released to indicate the PTT requestor/call originator is through speaking (592), then a keep alive timer is initiated (594). The keep alive timer is preferably implemented on the PTT server in any known manner. The keep alive timer causes a dummy (that is, meaningless) packet of data to be sent to the mobile device of the PTT requestor/call originator as a measure to insure that the PTT requestor does not go into a dormant state. If there is no activity, i.e., no packets sent or received, on a device for a certain period, the device goes dormant to conserve power and other resources. Preventing the mobile device of the PTT requestor from going dormant is preferred, since it is likely that the initial speech burst by the PTT requestor will be followed by some response from a participant in the call. Given this likelihood, it is preferred to prevent the mobile device of the call originator from going into a dormant state, at least before the buffered speech is played out. To avoid the mobile device of the call originator from going into the dormant state, the keep alive timer is set to send the dummy packet just prior to the expiration of the time period at which the mobile device goes dormant due to inactivity. After the buffered speech burst is played out, the keep alive timer stops sending dummy packets, thereby allowing the mobile device of the call originator to subsequently go dormant. Without the keep alive timer, the PTT requestor might go into the dormant state prior to receiving a likely response, which would delay delivery of the response.

After the buffer of the media duplicator 150 begins to receive voice packets, the Media duplicator 150 determines whether the buffer capacity of the media duplicator 150 has been exceeded. If the buffer capacity of the media duplicator 150 has not been exceeded, then the voice packets are duplicated by the media duplicator 150 (610) and transmitted to each of the mobile devices 110 participating in the call (620) via cellular 120. If the buffer capacity of the media duplicator 150 has been exceed, the oldest voice packets are discarded by the media duplicator 150 (630). Where a first-in first-out, wrap around buffer is used, when the buffer capacity is exceeded (600), the oldest packets are automatically written over, leaving the most recent packets in the buffer.

The voice packets are stored in a buffer in the media duplicator 150 until a voice packet transmission triggering event occurs (602). The voice packet transmission triggering event can be, but is not limited to, the time at which a predetermined and preferably configurable percentage of the called parties begin participation in the call, the time at which a predetermined and preferably configurable time period expires, and the time at which all of the called parties begin participation in the call. After the voice packet transmission triggering event, the stored digitized voice packets in the buffer are transmitted (620). The voice packets are transmitted at a rate sufficient to prevent the mobile device 110 from being overwhelmed with information. That is, a rate no higher than the speech rate is maintained.

The voice packet buffering on the initial speech burst described above provides a desired effect in that the perceived time to the beginning of speech transmission from a PTT request is reduced. However, buffering the voice packets in general is not preferred and, after the buffer holding the initial burst is emptied, subsequent voice packets are not buffered, but instead are duplicated by the media duplicator 150 and immediately transmitted by the media duplicator 150 to each of the mobile devices 110 participating in the call.

The PTT feature of a wireless network is improved by reducing the perceived time to connect using the push-to-talk feature. This is accomplished without wasting communications resources. And, push-to-talk conference calls are better controlled by the addition of queuing based on priority and an interrupt feature to gain the floor.

Although the present invention has been described with reference to preferred embodiments, those skilled in the art will recognize that changes may be made in form and detail without departing from the spirit and scope of the appended claims.

What is claimed is:

1. In a telecommunications system using half-duplex communications and a push-to-talk feature, where communications channel resources are not always dedicated for a push-to-talk call, a method for buffering the initial speech of an initial speaker in a push-to-talk call, the method comprising the steps of:
    determining at least one participant or group to call;
    receiving a call request from the initial speaker to the at least one participant or group;
    determining when one of the at least one participant or group is registered with the telecommunications system;
    when one of the at least one participant or group is determined to be registered with the telecommunications system, then notifying the initial speaker to begin speaking prior to all called parties being connected to the call and prior to requesting a called party to come out of a dormancy state;
    receiving and digitizing voice packets from the initial speaker;
    storing the digitized data packets in a storage medium; and
    transmitting the digitized voice packets when a predetermined packet transmission triggering event occurs.

2. The method of claim 1, further comprising the steps of:
    inviting called parties to participate in the call; and
    duplicating the stored digitized voice packets for each of the called parties.

3. The method of claim 2, wherein the step of transmitting the stored digitized voice packets further comprises the step of transmitting the stored digitized voice packets when a predetermined percentage of the called parties begin participation in the call.

4. The method of claim 2, wherein the predetermined packet transmission triggering event is when a predetermined time period expires.

5. The method of claim 2, wherein the step of transmitting the stored digitized voice packets further comprises the step of transmitting the stored digitized voice packets when all of the called parties begin participation in the call.

6. The method of claim 2, wherein the step of transmitting the stored digitized voice packets further comprises the step of transmitting the stored digitized voice packets at a predetermined rate.

7. The method of claim 1, wherein the step of storing the digitized voice packets further comprises the step of storing the digitized voice packets until a predetermined amount of digitized voice packets have been received.

8. The method of claim 1, further comprising the step of allocating resources for the call, including assigning a means for duplicating the digitized voice packets and a voice packet transfer medium to the call.

9. In a telecommunications system using half-duplex communications and a push-to-talk feature, where communications channel resources are not always dedicated for a push-to-talk call, an apparatus buffering the initial speech burst of an initial speaker in a call, the apparatus comprising:
    a server programmed to:
        determine at least one participant or group for a call;
        receive a push-to-talk request for the at least one participant or group;
        determine when one of the at least one participant or group is registered with the telecommunications system;
        when one of the at least one participant or group is determined to be registered with the telecommunications system, then notifying the initial speaker to begin speaking prior to all called parties being connected to the call and prior to requesting a called party to come out of a dormancy state;
        receive and digitize voice packets from the initial speaker;
        store the digitized data packets in a storage medium; and
        transmit the digitized voice packets from the storage medium to a mobile device upon the occurrence of a transmission triggering event.

10. The apparatus of claim 9, wherein the server is programmed to invite called parties to participate in the call.

11. The apparatus of claim 9, wherein the transmission triggering event is when a predetermined percentage of the called parties begin participation in the call.

12. The apparatus of claim 9, wherein the transmission triggering event is when a predetermined time period expires.

13. The apparatus of claim 9, wherein the server is programmed to transmit the stored digitized voice packets at a predetermined rate.

14. The apparatus of claim 9, wherein the transmission triggering event is when all called parties are connected to the call.

* * * * *